United States Patent [19]

Kowel et al.

[11] Patent Number: 4,813,772

[45] Date of Patent: Mar. 21, 1989

[54] ELECTRO-OPTICAL INTERFACE

[75] Inventors: Stephen T. Kowel; Norman Matloff; Charles Eldering, all of Davis, Calif.

[73] Assignee: The Regents of the University of California, Berkeley, Calif.

[21] Appl. No.: 94,110

[22] Filed: Sep. 8, 1987

[51] Int. Cl.[4] ........................... G02F 3/00; G02F 1/35

[52] U.S. Cl. .................................... 350/388; 350/390; 350/392; 365/64; 365/106

[58] Field of Search ............... 350/356, 390, 388, 392, 350/393; 364/713, 837; 340/795-796; 365/64, 106, 108, 120-121, 215, 234-235

[56] References Cited

U.S. PATENT DOCUMENTS

| | | | |
|---|---|---|---|
| 3,488,636 | 1/1970 | Dyck | 365/106 |
| 3,631,411 | 12/1971 | Kosonocky | 365/64 |
| 3,840,695 | 10/1974 | Fischer | 350/392 |
| 4,139,909 | 2/1979 | Kitovich et al. | 365/120 |
| 4,229,071 | 10/1980 | d'Auria et al. | 350/392 |
| 4,589,098 | 5/1986 | Dietrich | 365/215 |

FOREIGN PATENT DOCUMENTS

| | | | |
|---|---|---|---|
| 44613 | 3/1980 | Japan | 365/235 |
| WO8700347 | 1/1987 | PCT Int'l Appl. | 350/356 |
| 555441 | 5/1977 | U.S.S.R. | 365/64 |
| 637871 | 12/1978 | U.S.S.R. | 365/106 |

OTHER PUBLICATIONS

Broussoux et al, "Electro-Optic and Elasto-Optic Effects in Polyvinylidene Fluoride", Jr. App. Phys. 4-1980, pp. 2020-2022.

Smith et al, "Optical Storage in Helicene Films" IBM Tech. Disc. Bull., 11-1973, pp. 1757.

Cross et al, "Optically Nonlinear Langmuir-Blodgett Films: Linear Electro-Optic Properties of Monolayers", Jr. Opt. Soc. Am., 6-1987, pp. 962-967.

*Primary Examiner*—John K. Corbin
*Assistant Examiner*—Martin Lerner
*Attorney, Agent, or Firm*—Peter J. Dehlinger

[57] ABSTRACT

Two electro-optical computer interface embodiments provide for one-way read only and two-way optical read and write. The two-way embodiment includes a main module having a shared memory, and a processor/controller and a main bus. A plurality of local processor modules each includes a local memory, a local processor, and a local bus. The processors are electrically joined by control conductors which provide for coordination and timing between local processors and the main processor. Each memory array has a film deposited on it by the Langmuir/Blodgett technique. The memory arrays are each illuminated by a pulsed laser or Q-switched laser. The film is responsive to the electric fields in the memory array cells for modulating the illumination light. The image is then read onto other memory arrays which are responsive to the illumination for transferring the data between memories.

7 Claims, 3 Drawing Sheets

ELECTRO-OPTICAL INTERFACE

FIELD OF THE INVENTION

This invention relates to the field of electro-optical interfaces, and particularly of such interfaces for communicating optically the state of one electronic element to another electronic element.

BACKGROUND OF THE INVENTION

The present invention has particular application to optical computer interfaces. The following discussion and the preferred embodiments to be described are directed specifically to this area. It will be understood that it also has in its general sense application in other areas. Some of such alternate uses will also be discussed.

A computer consists of one or more processors, which do the actual computation and decision making, and memory, which stores programs and data. Most systems, even today, have a single processor. As the demand for faster computers grew, multiprocessor systems were developed. In theory, a system with p processors could run p times faster than a single-processor system.

For example, consider a database search, e.g. a physician searching a medical database for all recent references on a given disease. The database can be partitioned into p parts, and each processor can search its part of the database. Since all this is happening in parallel with respect to the p processors, then there is a potential speedup of a factor of p.

However, this factor-p speedup has yet to be realized in a real system, chiefly due to contention among the p processors for limited resources. If two processors try to access the same memory module at the same time, one of the processors must wait. In the database application mentioned above, even though the database has been partitioned, a given memory module may contain several parts. Thus, the processors may still clash occasionally, which results in loss of the parallelism depended on for the speedup. Also, processors may have to contend for the interconnect between the proces rs and the memory modules.

These problems have resulted in processing speedup factors much smaller than the theoretical value p, and have continued to plague multiprocessor technology to the present time. See, for instance, Siewiorek et al., *Computer Structures: Principles and Examples,* McGraw-Hill, 1982; Hwang et al., *Computer Architecture and Parallel processing,* McGraw-Hill, 1984; and Agrawal, *Advanced Computer Architecture,* IEEE Computer Society, 1986. Essentially no real time solutions have been found. For example, Cray Research, Inc. recently released the Cray X-MP, a multiprocessor version of the Cray-1 supercomputer. A number of investigations (Bailey, "Vector Computer Memory Bank Contention, " *IEEE Transactions on Computers,* 1987, C-36, 3, 293–298; Cheung et al., "A Simulation Study of the Cray C-MP Memory System," *IEEE Transactions on Computers,* 1986, C-36, 7, 613–622; and Oed et al., "Modeling, Measurement and Simulation of Memory Interference in the Cray X-MP, " *Parallel Computing,* 1986, 343–358) quickly showed the system to suffer from slowdowns due to both contention for shared memory and contention for the network which connects the processors to that memory.

Perhaps an even more dramatic example is the S-1, a TC multiprocessor system developed at Lawrence Livermore National Laboratories (Hwang et al., 1984). Throughout the period of development of this system, it was hailed as one of the most advanced multiprocessor projects in existence. However, recently the project was discontinued, in spite of all the favourable publicity, and the very extensive funds expended. One of the primary reasons given for the discontinuation was that the project engineers had found that the contention for shared memory in the system would be much greater than they had anticipated. They are now beginning to work on a completely new design.

Another obstacle to achieving factor-p speedup is that memory "chips" have a very small pins-to-bits ratio. A memory chip can store thousands or even millions of bits of information, yet this information is accessible through only a small number, such as 8 or 16, of data pins. This has been a problem even in uniprocessor systems; some processors can consume data much faster than the rate at which it can be accessed in a memory chip.

In conventional interconnect technology, the simplest interconnect is a bus, which consists of a single set of wires. All processors and memory modules are attached to the bus. Since processors access memory solely through this single path, it is immediately clear that the contention between processors and memory modules for the interconnect is very severe.

At the other extreme among interconnect structures is the crossbar. Here there are essentially mp processor-memory paths, one for each processor-memory module pair (m being the number of memory modules). There is no interconnect contention for this structure. However, as m and p get large, the size of the product mp grows at a very rapid rate, rendering the crossbar far too expensive a solution. Also, the more complex the crossbar, the more delay is added by the crossbar switching elements, i.e. although there are a sufficient number of paths to memory, each path gets slower. Furthermore, the crossbar still does not solve the problems of accessing the same memory module at the same time and the small pins-to-bits ratio.

Due to the expense and delay associated with a crossbar, a large number of intermediate designs have been proposed (Siegel, *Interconnection Networks for Large-Scale Parallel Processing,* Health, 1985). Such designs are aimed at providing almost as many processor-memory paths as does a crossbar, but with considerably less complexity. However, again the problems of memory module access and small pin-to-bits ratio remains, and the problem of processors having to contend for the interconnect between the processors and the memory modules remains in part.

Several recent articles have discussed the merits of optical interconnects for VLSI systems. See, for instance, Goodman et al., "Optical Interconnections for VLSI Systems", *Proc. of the IEEE,* vol. 72, no. 7, pp. 850–865, 1984; and Neff, "Alternative to VLSI", *Defense Science and Electronics,* May 1986, pp. 23–29. These have shown that the use of optical and electro-optical technologies should be able to overcome pin-limitation problems and increase system operating speeds. Electro-optical conversion of data is one way of realizing optical interconnects but has been hindered by a lack of suitable systems/materials for such conversion.

The loading of an array of "data" into an integrated circuit is described in International Application No. PCT/GB85/00404 of Ullman et al. for "Method and Apparatus for Loading Information into an Integrated Circuit Semiconductor Device", published as International Publication No. WO 86/01931. This loading does not, however, include the transfer of information electro-optically out of an integrated circuit. It relies instead on the use of a spatially modulated mask to define the information or data loaded.

SUMMARY OF THE INVENTION

The present invention overcomes these basic limitations of the present systems in an heretofore unconventional manner. More particularly, the present invention eliminates the problems of (a) access of the same memory by a plurality of processors, (b) contention for the interconnect between processors and memory modules, and (c) the accessing of potentially all of the memory cells simultaneously.

With the present invention, many processors will be able to optically read a memory chip without interfering with each other. Each processor has its own optical path to memory. Further, memory cells or bits are accessed directly, not through pins, and all the bits are accessed simultaneously.

Generally, the invention provides an electro-optical interface having a first electrical element operable to vary the magnitude of an electrical characteristic, such as an electrical field; means coupled to the first element for generating an optically perceptible image indicative of the magnitude of the electrical characteristic of the first element; a second electrical element responsive to optical radiation; and means coupled to the image-generating means and responsive to the optical image for transmitting the optical image onto the second element, the second element being responsive to the optical image for indicating the magnitude of the electrical characteristic of the first element.

As used herein, the term electro-optical refers to the conversion of information between an electrical characteristic, such as an electrical voltage appearing on an electrical element and the associated induced electrical field, and an optical characteristic of the light, such as its amplitude, frequence and phase. This conversion is accomplished through a material property such as electrochromism, electrobirefringence and electrodichroism.

Preferably, the image is generated by a film disposed on the surface of the first element which is responsive to the electrical field of the first element for generating an optical image indicative of the electrical field when illuminated in a predetermined manner, and a light source for illuminating the film surface in the predetermined manner.

The invention also contemplates a method of electro-optically communicating information from a first electrical element to a second element wherein the first element is operable with an electrical characteristic and the second element is responsive to illumination. The method comprises generating an optically perceptible image indicative of the electrical characteristic, such as by depositing a film on the first element, which film is responsive to the electrical characteristic of the first element in a manner producing an optical characteristic indicative of the electrical characteristic when illuminated in a predetermined manner; operating the first element; illuminating the operating electrical element in the predetermined manner; transmitting the reflected optical image onto the second element; and operating the second element in a manner in which the second element is responsive to the transmitted incident optical image for indicating the electrical characteristic of the first element.

The preferred form of practicing the present invention contemplates the use of an optically nonlinear film to provide for electro-optical conversion of data. In particular, the use of Langmuir/Blodgett deposition techniques provide a means of fabricating robust, high quality, thin films. These polymer films include molecules chosen for their extraordinarily large nonlinear coefficients. Other applicable techniques for producing an optically nonlinear film include spin-on and poled techniques, along with self-assembly.

In the preferred embodiment, a hybrid electro-optic multiprocessor system is provided which uses nonlinear optical films to create a global, fixed, optical interconnect system for multiprocessor architecture without memory contention. A plurality of microelectronic processors contain imaging arrays which function as memories and as parallel input/output ports. These processors, in what may be referred to as a tightly coupled configuration, view a central shared memory which contains an array of photosensitive detectors such as CCD's or DRAM's covered by a polymeric film containing highly nonlinear molecules. Illumination of this shared memory array produces a reflected beam whose optical characteristics are modulated by the electric fields at the gates of the individual devices. The beam is focused onto the processor imaging arrays which can read the entire shared memory simultaneously and at will, without contention. The polymeric film thus provides an optical write-bus to each processor. In an alternative embodiment, the processor imaging ports are also coated with identical films so that the processors can also write optically to the shared memory.

This invention may also be used in a multiprocessor system having a loosely-coupled configuration. That is, instead of there being a core shared memory, each processor has its own memory and the various processors communicate with each other through a network formed, at least in part, of electro-optical interfaces according to the invention.

The present invention is generally useful for conveying, optically, information between electrical elements, and particularly, between spaced planar arrays of spatially distributed elements. These includes such elements as logic gates as well as memory cells. Further, the present invention is well suited for diagnostics of operating voltages of integrated circuits. These integrated circuits may be either digital or analog devices.

As applied to computers, this invention provides significant advantages over other proposed solutions to the bus bottlenecks which become more severe with increasing chip complexity. It marries the parallelism of unguided optical systems with the memory and logic capabilities of silicon integrated circuit technology. In this manner, speed enhancement is gained without further miniaturization or addition of I/O pins and the corresponding logic, both of which are expensive and difficult tasks.

These and other advantages and features of the present invention will become apparent from a review of the drawings and the following detailed description of the preferred embodiments.

DETAILED DESCRIPTION OF THE PREFERRED EMBODIMENTS

Figure 1:
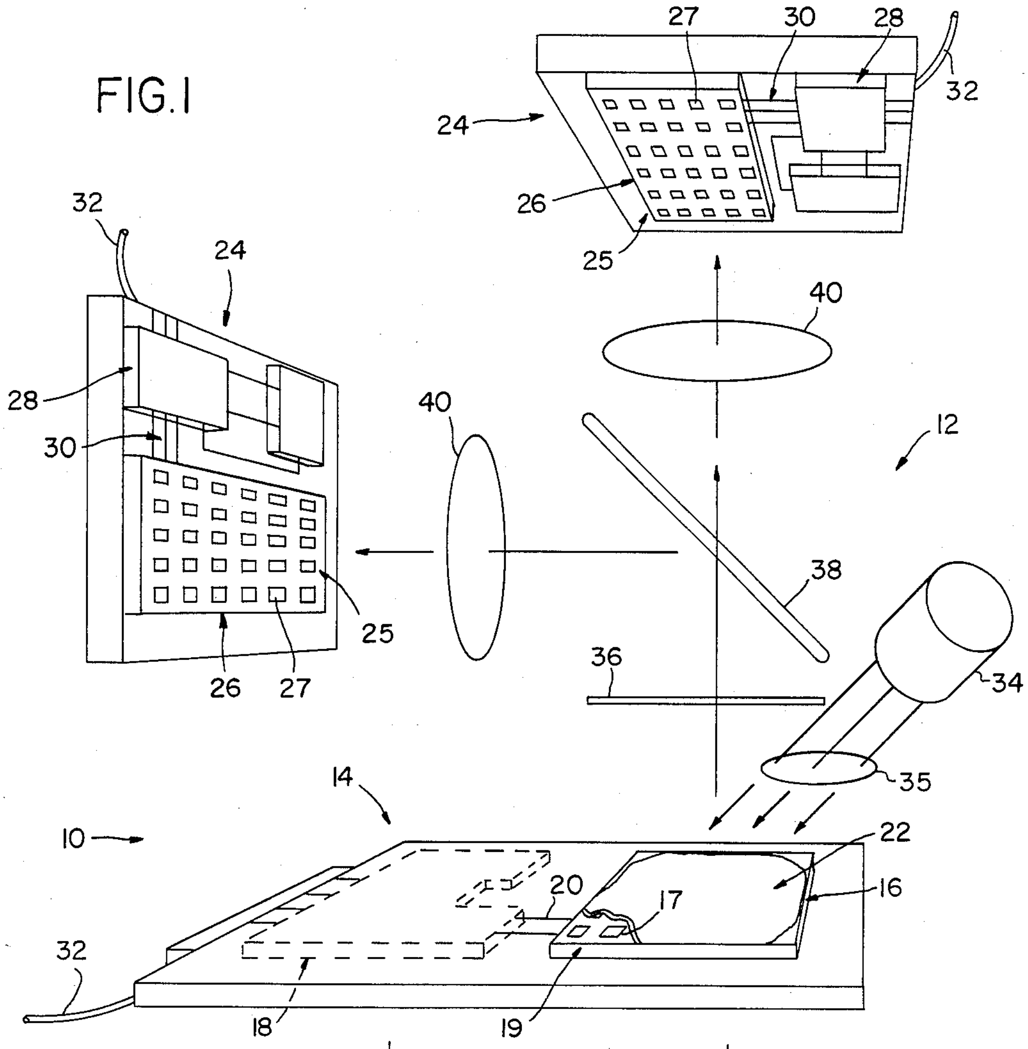
FIG. 1 is a simplified schematic representation of a preferred embodiment of a multiprocessor system made according to the present invention.

Referring initially to FIG. 1, a computer 10 having an electro-optical interface 12 made according to the invention is shown. Computer 10 includes a main module 14 having a shared memory integrated circuit 16. When configured in a loosely coupled system, module 14 also includes a processing unit 18 (shown in phantom lines) connected by a main bus 20 to memory 16. Processor 18 is a conventional processor, such as a Motorola 68000 which controls system operation and shared memory 16 electrical writes and reads. Bus 20 is also conventional, such as a VME bus. Memory 16 also is a convetional CCD or CID, such as are available from General Electric Company or Hughes, or DRAM such as are also available from Motorola. Unit 18 could also function as a controller for the system using shared memory 16, such as for use to parcel out subarrays in sorting.

Each memory 16 includes a plurality of first elements 17, shwon simplistically as rectangles, formed in an array 19. An element, as used herein, is an object or group of objects, such as the gate of a transistor, a capacitor, or a conductor, having an analog or digital voltage.

The memory is coated with a film 22 responsive to the electrical field in the array of cells in the memory. The details of this film and how it functions is discussed further below.

Although a great number of local processor modules 24 are contemplated, only two are shown for simplicity. Each local processor module 24 has a substantially identical local memory 26. These local memories preferably have the identical memory cell spatial arrangement as does shared memory 16 for simplicity of the optics. Local processor modules 24 also contains local processor 28 connected to the local memory by a local bus 30. The various local processor modules are coupled for general control purposes to main module 14 by conductors 32.

In addition to the memories, it is contemplated that each module hs chips which are in one-to-one correspondence with chips in the main memory, with the i-th chip on a local bus acting as a receiver for the i-th chip in the shared memory. For simplicity, a single shared memory chip and local memory chip are shown.

Each shared memory chip 16 has a light source 34 which directs light onto memory chip 16 through a focusing lens 35. In this preferred embodiment, the light is polarized, with the film 22 modulating the polarization of the light depending on the local voltages. A polarizer filter 36 is placed above memory 16 to produce an intensity map of the array of gates from the birefringence in the film.

The reflected beam passing through filter 36 is directed toward local processor modules 24 by suitable optical apparatus, such as with half silvered mirror or beam splitter 38. The beam is then focused on the local memory by a lens 40.

Figure 2:
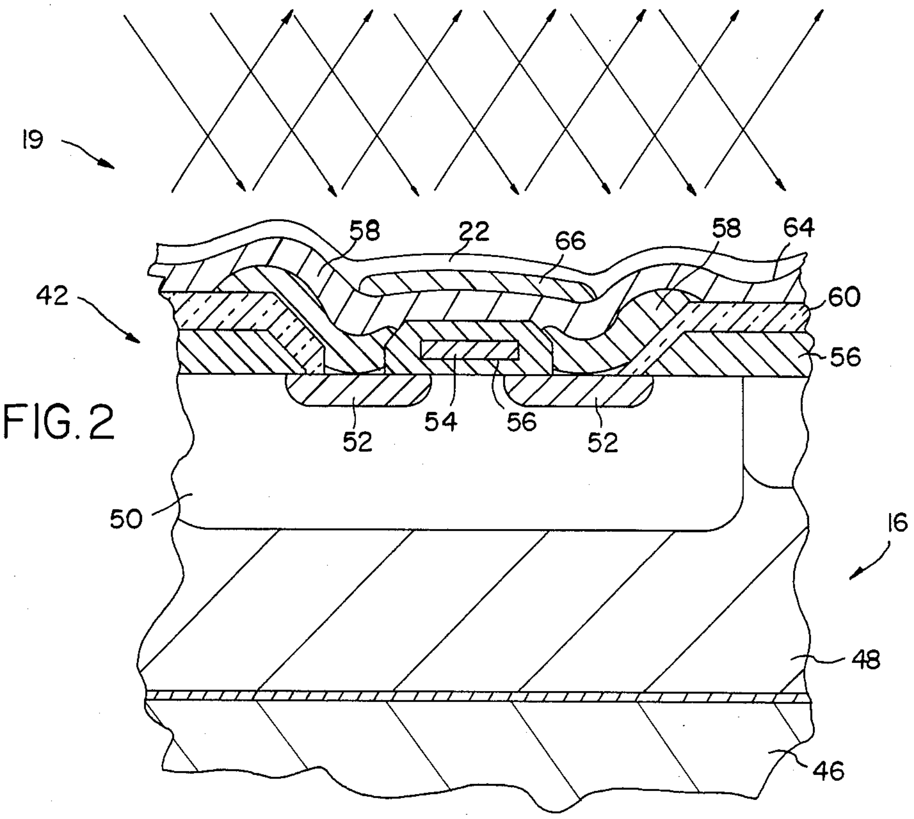
FIG. 2 is a simplified cross-sectional view of a portion of a memory cell in an integrated circuit of a shared memory in FIG. 1.

FIG. 2 illustrates a typical cross section of a conventional light-sensitive transistor in a memory cell 42 of main memory array 19. Cell 42 or portions of it function as element 17 discussed with reference to FIG. 1. On an $n^+$ substrate 46 is an $n^-$ epitaxial layer 48. A $p^-$ TUB 50 on layer 48 has $n^+$ drain and source regions 52 connected through a polysilicon gate 54 embedded in an insulating thermal oxide layer 56. Contacts 58 are of a suitable conductor such as aluminum. A P-Glass layer 60 is on thermal oxide layer 56. The integrated circuit is completed by a nitride layer 62 covering the entire top and forming an upper surface 64 on array 19. Gate 54 of a DRAM is light sensitive. In order to prevent it from being affected by the illumination from light source 34, a mask 66 is disposed on it .

On top of array 19 is deposited a uniform layer or film 22 mentioned previously. Film 22 is preferably deposited using a Langmuir-Blodgett (L/B) technique. The thin L/B film is made of layers of highly nonlinear molecules. The molecules in the L/B film have electro-optical coefficients which are much larger than the coefficients of inorganic materials, such as $LiTaO_3$.

It has been found that electro-optic sampling using thick pieces of $LiTaO_3$ on which coplanar strip transmission lines were deposited has been performed with signals of 30 mV across =um being easily detected. (See Mourou et al., "Subpicosecond Electro-optic Sampling Using Coplanar Strip Transmission Lines", *Applied Physics Letters,* vol. 45 (5), pp. 492–494, 1984.) In this configuration the local fields of the strip line extended approximately 50 micrometers (um) into the electro-optic material and thus the modulated portion of the material was 50 um thick.

Inthe case of a thin organic film which has electro-optic coefficients which are much higher than those for an inorganic material such as $LiTaO_3$, the local fields between the conductors (which are on the order of $10^6$ V/m) will be sufficient to modulate the film.

Various techniques are used for depositing layers of material using the Langmuir-Blodgett techniques. One such approach is disclosed in U.K. Pat. No. 2,144,653A, issued to Girling et al. However, the manufacture of L/B films is preferably performed by interleaving hemicyanine with behenic acid.

The films are deposited on surface 64 of the desired integrated circuit which have been cleaned and prepared for L/B deposition. The subphase is distilled water with a pH of about 4.7. The hemicyanine layers are deposited on the upstroke, and the behenic acid is deposited on the downstroke. The procedure starts with an upstroke of hemicyanine and ends a multilayer deposition with an upstroke of hemicyanine. Thus there is one less layer of behenic acid as compared to the number of layers of hemicyanine in a completed multilayer interleaved L/B film.

The dipping protocol is as follows. The clean circuit is immersed in the subphase. A film of hemicyanine is spread on the air-water interface. The solvent is allowed to evaporate. The monolayer is then compressed at a rate of 2.4 squared angstroms per second using a discontinuous compression process. The monolayer is compressed to a pressure of 30 dyne/cm.

The monolayer is allowed to relax at a constant surface pressure until the decrease in area is less than 0.05 $cm^2$/min. The circuit is pulled out through the subphase to deposit hemicyanine, but is not removed completely from the subphase. The air-water interface is cleaned with an aspirator.

The film of behenic acid is spread and the solvent is allowed to evaporate. The monolayer is again compressed as described above to a surface pressure of 30 dyne/cm. The monolayer is again allowed to relax at constant surface pressure until the decrease in area is less than 0.05 $cm^2$/min. The circuit is then lowered down through the air-water interface for a down stroke deposition of behenic acid. The air-water interface is again cleaned with an aspirator.

This process is continued until the desired thickness is reached. When it has, the last monolayer of hemicyanine is spread, the solvent allowed to evaporate, and the monolayer is compressed and allowed to relax as described above. The circuit is then raised through the air-water interface to deposit the last layer of hemicyanine. On this stroke the circuit is raised completely out of the interface and dried.

In addition to the L/B technique, several other methods may be useful, including spin-on, poling and self assembly.

Figure 3:
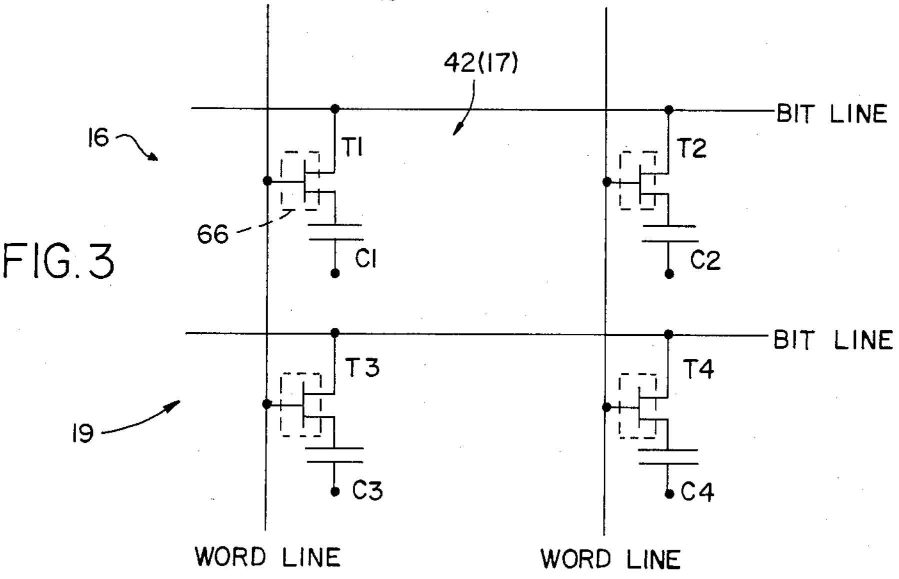
FIG. 3 is a circuit diagram of representative memory cells of the circuit of FIG. 2.

FIG. 3 represents one form of a DRAM for use as the memory array 19 of shared memory 16. The four cells, such as cell 42, have a transistor T1 and a storage capacitor C1. In order to prevent the altering of data during illumination of these cells, mask 66 is placed over the sensitive gates. This leaves the capacitors exposed, which carry the charge and produce the electric field to which the L/B film is responsive.

Memories 26, formed of arrays 25 of spatially distributed elements 27, are also structured like memory 16 but do not have mask 66 covering the light sensitive areas. In making a read operation which can be done at any time by any or all of the local processors, the array is first cleared into a state in which each memory cell will remain if not illuminated and then the following continuous illumination would only alter those for which there was a corresponding bit value in array 19. The receiving device (memory 26) is slightly off axis such that the optically modulated areas associated with the presence of the electric field in main memory 16 correspond to the light sensitive areas of the receiving device.

Figure 7:
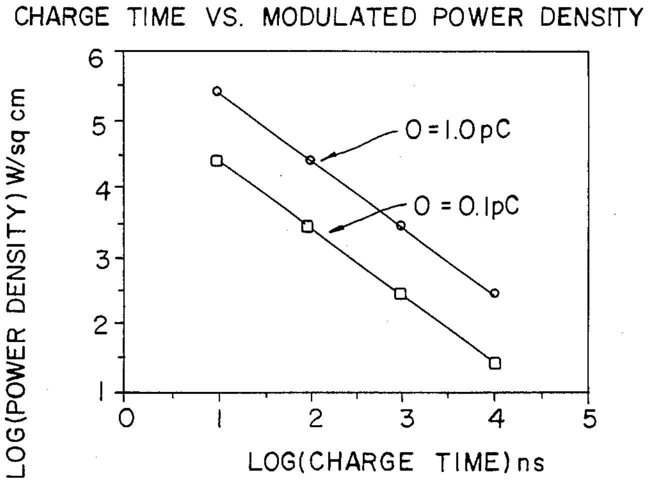
FIG. 7 is a chart showing the charge time for an optical device as a function of modulated beam intensity.

FIG. 7 shows the charge time for an optical receiving device as a function of modulated beam intensity. The charge time is equivalent to 'write time' during which the entire memory is filled. The calculations for this graph were made assuming a charge of 1.0 pC was necessary to represent a "one" and a quantum efficiency of 0.3 for the imaging device at a wavelength of 0.633 um. For a modulated beam power density of 300 $MW/cm^2$, the charge time for the array (considering each memory cell to have a light-collecting area of 5 um$\times$5 um) is under 100 ns.

If the device was specially designed, it could have a charge packet in the order of 0.1 pC. In this case the conversion time would drop to less than 10 ns, resulting in a data transfer rate approaching 10-B/s for a 1024$\times$1024 array. Using the DRAM design, the optical write takes the place of the required refresh cycle so that memory is continually updated. This design does not require a designated "write" cycle, and yet the memory always contains the most recent information of the shared memory.

Figure 4:
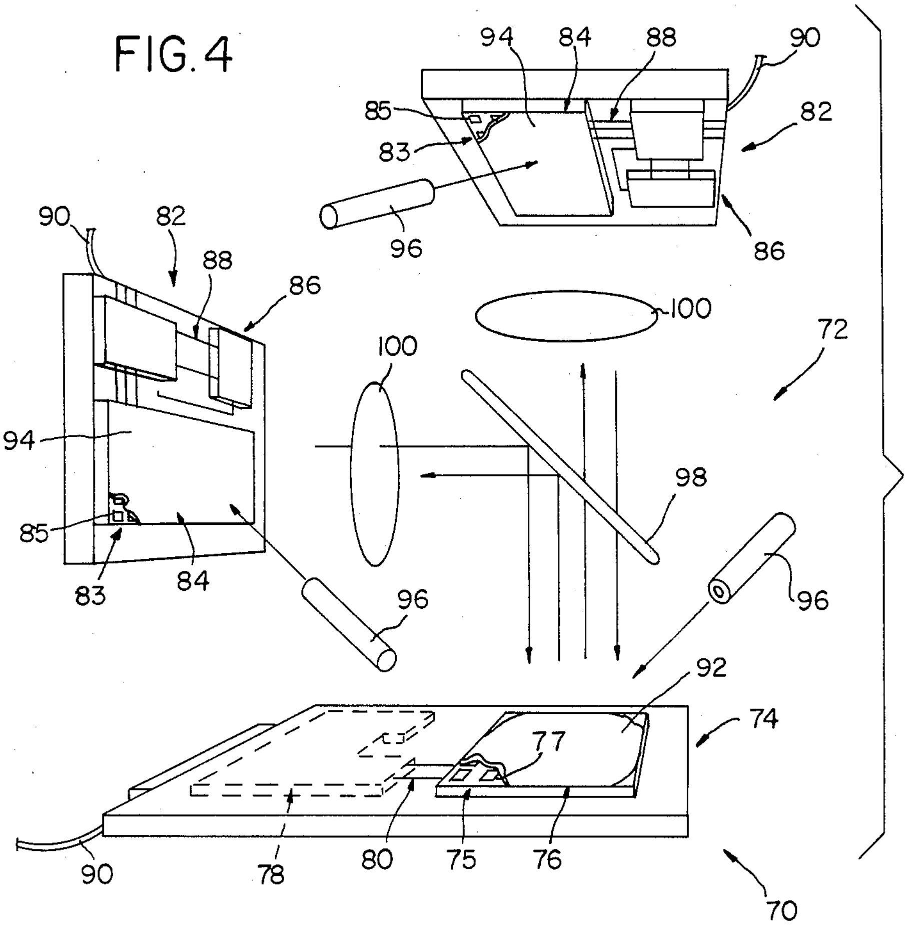
FIG. 4 is a simplified schematic representation similar to FIG. 1 of a second preferred embodiment of the invention.

Referring now to FIG. 4, a second preferred embodiment of the invention is shown. This system is a little more complex in that is provides for two-way optical read and write, rather than read only as was provided in the embodiment of FIG. 1.

This embodiment also includes similar components, such as a computer 70, electro-optical interface 72, and main module 74 having a shared memory 76 formed as an array 75 of elements 77. As discussed with reference to FIG. 1 and module 14, module 74 may also have a processor 78 and main bus 80. Each local processor module 82 includes a local memory 84 (formed as an array 83 of elements 85), local processor 86, and local bus 88. The processors and shared memory are electrically joined by control conductors 90 which provide for coordination with a master, such as processor 78, performing the control and coordination functions.

In this case, each memory array has a L/B film deposited on it, such as films 92 and 94 on memories 76 and 84, respectively.

The illumination for the computer is provided by pulsed lasers or Q-switched lasers 96 for memories 76 and 84. These lasers are picked to provide a light with a wavelength and optical power suitable for the system components and materials. These lasers include suitable optics to focus the beams on the respective imaging arrays. These lasers provide a clock and insure that only one array writes at a time. Cycle times of nanoseconds which are typical of such devices are compatible with both the lasers and CCD and CID silicon devices.

This system could also be configured with a single laser illuminating all local memories and an addressable electro-optical shutter adjacent each memory to control the reading and writing of the local memories. A fly's-eye lens could be used to transmit images between the shared memory and the processors.

Figure 5:
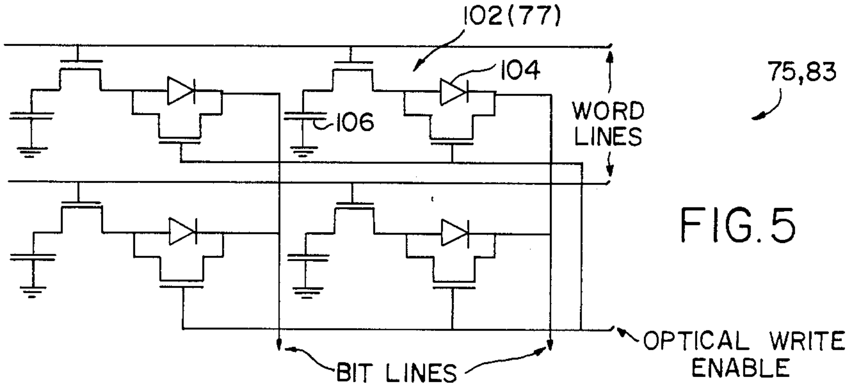
FIG. 5 is a partial circuit diagram showing the design of memory cells used in the embodiment of FIG. 4.

The embodiment of FIG. 4 is the same as that described for FIG. 1 except that writes are done optically. Thus, there is no system bus. The system memory chips are the same, with one-to-one correspondence of local memory with shared memory. Again ther is a system of beam splitters, such as splitters 98, and focusing lenses 100. However, the memories 76 and 84 are made with memory cells 102, as shown in FIG. 5. Each cell 102 or portion of cell 102, as appropriate, functions as an element 77.

FIG. 7 illustrates memory cells which allow for optical as well as electrical read/write operations. This modified DRAM design allows for traditional access to the memory locations through electrical addressing, while also having a photodiode 104 which can charge the memory cell capacitor 106 during an optical write operation.

By controlling the bit lines it is possible to prevent the photodiode from charging the cell capacitor. This allows for illumination of the device for optical reads without the destruction of the contained electrical information. The layout of the device is such that the electrical information in each cell 102 generates a suitable electric field at the surface to modulate the electro-optic film. These fields are typically in the order of $10^5$ to $10^6$ volts per meter. The optical system is designed such that the reflected signal from the transmitting device is slightly defocused at the receiving device, in order that the light sensitive area of the receiving device becomes a transmitting memory and is illuminated, the defocused condition serves the same function for the memory which is now a receiving device.

Figure 6:
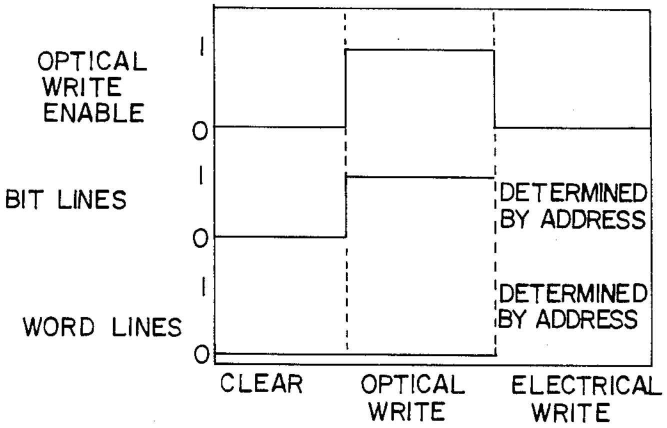
FIG. 6 is a chart showing signal levels of control lines in the circuit of FIG. 5.

FIG. 6 illustrates the control signals for operating the circuit of FIG. 5. The transistors, such as transistor 105, shown in FIG. 5 are preferably P-channel enhancement MOS devices. FIG. 6 shows the relationship between bit-value voltages supplied to the cell by the word lines and bit lines. When the word lines are held low the photodiode is electrically connected to the cell and will charge the capacitor when illuminated.

The second embodiment with both optical read and write capabilities makes the computer essentially free of contention problems. The resulting high-speed architecture is very suitable for applications which tend to use a large number of memory cycles or those which have a high degree of inherent parallelism, and can profit from a multiprocessor system with a large number of processors.

Some memory access delay is still present, due to processor synchronization mechanisms which are inherent in any parallel computer architecture. However, essentially all of the delay due to classsical multiprocessor contention is eliminated and memory access speedups of one or two orders of magnitude are obtained. In addition, many other sources of memory access delay, e.g. 'handshaking' delays in a bus link, or routing delays in crossbar link, are eliminated.

It will be appreciated that variations in the embodiments may be made without departing from the spirit and scope of the invention as defined in the claims. As has already been discussed various forms of films and memory devices may be used. Further, multiple shared memories could be used.

In addition to the performance enhancement resulting from the use of optical interconnects, the invention is also capable of use in performing matrix based operations. In such an application, a main processor/memory only processes data from spatially adjacent cells in the memory, and places the output in a specific location in the main memory. The remote processors then read the output data, reconfigure it in the local memory, and rebroadcast the image for the subsequent operation. The local processor can thus accomplish tasks such as matrix multiplication, sorting and FFTs by simply presenting the information to the main processor/memory in the correct spatial arrangement and sequence.

Due to the inherent nonlinear nature of the films which would be employed in this system, analog computation is also an attractive possibility. Field mixing in the film produces the product of two incident optical signals and thus multiplication of entire matrices in one operation may be possible. Combined with matrix operations as discussed above it would be possible to develop computing systems which perform matrix-based operations for image processing or similar applications in a fraction of the time required by present all-electronic processors.

We claim:

1. In a multiprocessor computer system containing a plurality of processors, an electro-optical interface for communicating simultaneously between one processor and each of a plurality of other processors in the system comprising:

a first integrated-circuit memory associated with the one processor and having a first planar array of bit cells, each cell storing a bit-indicating charge, such that the memory state of the first memory is represented by a planar array of bit-value-indicating charges;

an electro-optical film material associated with each bit cell in the first memory and responsive to electric fields produced by the bit-indicating charges stored in said cells for producing optical characteristics indicative of the bit values, such that the memory state of the first memory is represented by first planar array of bit-value-indicating optical characteristics;

means for generating a fist optical image of said first array of bit-value-indicating optical chracteristics;

a second integrated-circuit memory associated with each of the other processors in the system, each second memory having a second planar array of bit cells in substantially the same arrangement as said first array of bit cells, said second-array bit cells in each of said second memories being responsive to the optical image of said fist array for assuming a one-to-one bit value mapping of said first memory, when said optical image is directed onto that second-memory planar array; and means coupled to said first image-generating means for directing said optical image simultaneously onto each of said second-memory planar arrays.

2. The system of claim 1 wherein at least one of the other processors in the system includes a transmitting memory having such an electro-optical film material associated with each bit cell in that memory and which is responsive to electric fields produced by the bit-indicating charges stored in said cells for producing optical characteristics indicative of the bit values, such that the memory state of the transmitting memory device is represented by a second planar array of bit-value-indicating optical characteristics, second means for generating a second optical image of said second planar array of bit-value-indicating optical characteristics; and means coupled to said second image-generating means and responsive to the second bit-value-indicating image for transmitting the second optical image onto a planar array of bit cells in a memory associated with the one processor, which is responsive to the second optical image for assuming a one-to-one bit value mapping of said transmitting memory, and control means coupled to said memories for generating a control signal for enabling selected memories to respond to said optical images.

3. The system of claim 2 wherein at least one of said first and second optical images is a modulation of a polarized incident light and said light source produces polarized light; said corresponding image-generating means further comprising a polarizing filter optically interposed said first and second memories.

4. The system of claim 1, wherein said means for generating the first optical image includes means for directing a light beam onto said first-memory array, and said first-memory optical image is a reflected-beam image.

5. The method of claim 4, wherein said light beam is polarized, said optical characteristics are related to changes in the polarization of light reflected by the film, according to changes in the corresponding bit-value-indicating charges, and said coupling means includes a polarizing filter through which the reflected-beam optical image is directed.

6. The system of claim 1, wherein said first memory device includes surface regions in addition to said bit cells which are responsive to illumination, to change the memory stae of the device, which further includes a mask covering said surface regions, to prevent illumination of the regions by said light beam.

7. The system of claim 1, wherein said first memory is a shared central memory device, and said second memories are peripheral memory devices.

* * * * *

UNITED STATES PATENT AND TRADEMARK OFFICE
CERTIFICATE OF CORRECTION

PATENT NO. : 4,813,772

DATED : March 21, 1989

INVENTOR(S) : Kowel, S.T.; Matloff, N.; Eldering, C.

It is certified that error appears in the above-identified patent and that said Letters Patent is hereby corrected as shown below:

In the Detailed Description of the Preferred Embodiments:

Change:

Column 5, line 41 "shwon" to --shown--.

Column 5, line 62 "hs" to --has--.

Column 6, line 37 "≈um" to --50 um--.

Column 7, line 68 "$10^{-}$B/s" to --$10^{15}$ B/s--.

Column 8, line 47 "ther" to --there--.

Signed and Sealed this

Thirty-first Day of October, 1989

*Attest:*

DONALD J. QUIGG

*Attesting Officer* *Commissioner of Patents and Trademarks*